US012645809B2

(12) United States Patent　　　　(10) Patent No.:　US 12,645,809 B2
Costa, Jr. et al.　　　　　　　　　(45) Date of Patent:　　Jun. 2, 2026

(54) ANALYZING AGGREGATED EVENT DATA TO IDENTIFY AND ADDRESS PERMISSIONS ISSUES

(71) Applicant: Microsoft Technology Licensing, LLC, Redmond, WA (US)

(72) Inventors: Marcio Costa, Jr., Bothell, WA (US); Michael John Speer, Seattle, WA (US); Margaret McCormack Garland, New York, NY (US); Vritti Sanjesh Rohira, Mountain View, CA (US); Jagadeesh Kalki, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 226 days.

(21) Appl. No.: 18/365,947

(22) Filed: Aug. 4, 2023

(65) Prior Publication Data

US 2025/0045426 A1　　　Feb. 6, 2025

(51) Int. Cl.
*G06F 21/60*　　　(2013.01)
*G06F 21/62*　　　(2013.01)
*H04L 9/40*　　　(2022.01)

(52) U.S. Cl.
CPC ........ *G06F 21/604* (2013.01); *G06F 21/6218* (2013.01); *H04L 63/102* (2013.01); *G06F 2221/2141* (2013.01)

(58) Field of Classification Search
CPC ............... G06F 21/604; G06F 21/6218; G06F 2221/2141; H04L 63/102
See application file for complete search history.

(56) References Cited

U.S. PATENT DOCUMENTS 8,856,859 B2 * 10/2014 Kirkup ................ G06F 21/6218
　　　　　　　　　　　　　　　　　　726/4
9,830,469 B1 * 11/2017 Anderson ............... G06F 21/44
(Continued)

FOREIGN PATENT DOCUMENTS

EP　　　　3512155 A1　　7/2019
WO　　2022115176 A1　　6/2022

OTHER PUBLICATIONS

"Analyzing Solorigate, the compromised DLL file that started a sophisticated cyberattack, and how Microsoft Defender helps protect customers", Retrieved from: https://www.microsoft.com/en-us/security/blog/2020/12/18/analyzing-solorigate-the-compromised-dll-file-that-started-a-sophisticated-cyberattack-and-how-microsoft-defender-helps-protect/, Dec. 18, 2020, 16 Pages.

(Continued)

*Primary Examiner* — Jason Chiang
(74) *Attorney, Agent, or Firm* — Ray Quinney & Nebeker P.C.; James S. Bullough

(57)　　　　　ABSTRACT

A computerized method analyzes permissions and identifies permission insights. A group of event records is obtained from a data source and a subgroup of event records associated with a user is identified in the obtained group of event records. The identified subgroup of event records is mapped to a group of required permissions using a permission hierarchy and a group of granted permissions of the user are identified. It is determined that the group of granted permissions of the user differs from the group of required permissions to which the subgroup of event records is mapped using the permission hierarchy. A permission insight action is performed based on determining that the group of granted permissions of the user differs from the group of required permissions. Thus, the method enables comprehensive analysis of permissions using data from (Continued)

multiple data sources to generate a single set of possible permission issues or insights.

20 Claims, 6 Drawing Sheets

(56) References Cited

U.S. PATENT DOCUMENTS

| | | | | |
|---|---|---|---|---|
| 10,043,030 | B1 * | 8/2018 | Kruse | G06Q 10/06 |
| 10,122,757 | B1 * | 11/2018 | Kruse | H04L 63/10 |
| 10,834,087 | B1 * | 11/2020 | Pillai | G06F 11/3476 |
| 10,944,758 | B1 * | 3/2021 | Nagargadde | G06F 21/6218 |
| 10,986,131 | B1 * | 4/2021 | Kruse | H04L 63/10 |
| 11,283,809 | B2 | 3/2022 | Bogdanich Espina et al. | |
| 11,388,163 | B2 | 7/2022 | Bargury et al. | |
| 11,868,324 | B2 * | 1/2024 | Kinney, Jr. | G06F 16/1873 |
| 12,039,066 | B1 * | 7/2024 | Sharma | G06F 21/6218 |
| 12,309,236 | B1 * | 5/2025 | Frazier, Jr. | G06F 16/9038 |
| 2009/0288164 | A1 * | 11/2009 | Adelstein | H04L 63/123 726/22 |
| 2014/0013400 | A1 | 1/2014 | Warshavsky et al. | |
| 2014/0215604 | A1 * | 7/2014 | Giblin | G06F 21/6218 726/21 |
| 2017/0163650 | A1 * | 6/2017 | Seigel | H04L 63/102 |
| 2019/0253430 | A1 * | 8/2019 | Gamache | G06F 21/41 |
| 2019/0392657 | A1 * | 12/2019 | Hadzic | G06F 21/604 |
| 2020/0175191 | A1 * | 6/2020 | Nerurkar | G06F 21/6227 |
| 2021/0084040 | A1 * | 3/2021 | Sakowicz | H04L 63/1425 |
| 2022/0188433 | A1 * | 6/2022 | Hung | G06F 21/51 |
| 2022/0224535 | A1 * | 7/2022 | Coffing | H04L 63/205 |
| 2022/0271938 | A1 * | 8/2022 | Ip | G06F 21/604 |
| 2023/0090190 | A1 | 3/2023 | Iila et al. | |
| 2023/0097770 | A1 * | 3/2023 | Dimitrova | H04L 63/1425 726/1 |
| 2023/0161871 | A1 * | 5/2023 | Heller | G06F 21/53 726/22 |
| 2024/0137368 | A1 * | 4/2024 | Kumar | H04L 63/105 |
| 2024/0193290 | A1 * | 6/2024 | Grossman | G06F 18/2132 |
| 2024/0250956 | A1 * | 7/2024 | Goff | H04L 63/108 |
| 2024/0297886 | A1 * | 9/2024 | Kumar | H04L 63/105 |
| 2024/0330418 | A1 * | 10/2024 | Montgomery | G06F 21/6218 |
| 2024/0414167 | A1 * | 12/2024 | Neystadt | H04L 63/1433 |

OTHER PUBLICATIONS

"AWS CloudTrail FAQs", Retrieved from: https://aws.amazon.com/cloudtrail/faqs/, Retrieved Date: May 16, 2023, 20 Pages.

"Azure Active Directory documentation", Retrieved from: https://learn.microsoft.com/en-us/azure/active-directory/, Retrieved Date: Mar. 27, 2023, 3 Pages.

"Grant Access to Authentication Settings for External Data Sources", Retrieved from: https://help.salesforce.com/s/articleView?id=sf.external_permsets_profiles.htm&type=5, Retrieved Date: May 9, 2023, 3 Pages.

"Performing Privilege Analysis to Identify Privilege Use", Retrieved from: https://docs.oracle.com/en/database/oracle/oracle-database/19/dbseg/performing-privilege-analysis-identify-privilege-use.html#GUID-44CB644B-7B59-4B3B-B375-9F9B96F60186, Retrieved Date: May 16, 2023, 26 Pages.

"Permissions Management", Retrieved from: https://learn.microsoft.com/en-us/azure/active-directory/cloud-infrastructure-entitlement-management/, Retrieved Date: Mar. 27, 2023, 3 Pages.

"Privilege Analysis", Retrieved from: https://www.oracle.com/database/technologies/security/priv-analysis.html, Retrieved Date: May 9, 2023, 4 Pages.

Kjerland, et al., "Overview of Microsoft 365 Lighthouse", Retrieved from: https://learn.microsoft.com/en-us/microsoft-365/lighthouse/m365-lighthouse-overview?view=o365-worldwide, Feb. 17, 2023, 3 Pages.

Lambert, John, "The hunt for Nobelium, the most sophisticated nation-state attack in history", Retrieved from: https://www.microsoft.com/en-us/security/blog/2021/11/10/the-hunt-for-nobelium-the-most-sophisticated-nation-state-attack-in-history/, Nov. 10, 2021, 5 Pages.

Omondi, et al., "Understanding delegated access", Retrieved from: https://learn.microsoft.com/EN-US/azure/active-directory/develop/delegated-access-primer, Mar. 15, 2023, 5 Pages.

Ravat, et al., "Introduction to granular delegated admin privileges (GDAP)", Retrieved from: https://learn.microsoft.com/en-us/partner-center/gdap-introduction, Mar. 22, 2023, 2 Pages.

Vala, et al., "Delegated administration privileges (DAP) FAQ", Retrieved from: https://learn.microsoft.com/en-us/partner-center/dap-faq, Mar. 2, 2023, 6 Pages.

* cited by examiner

300

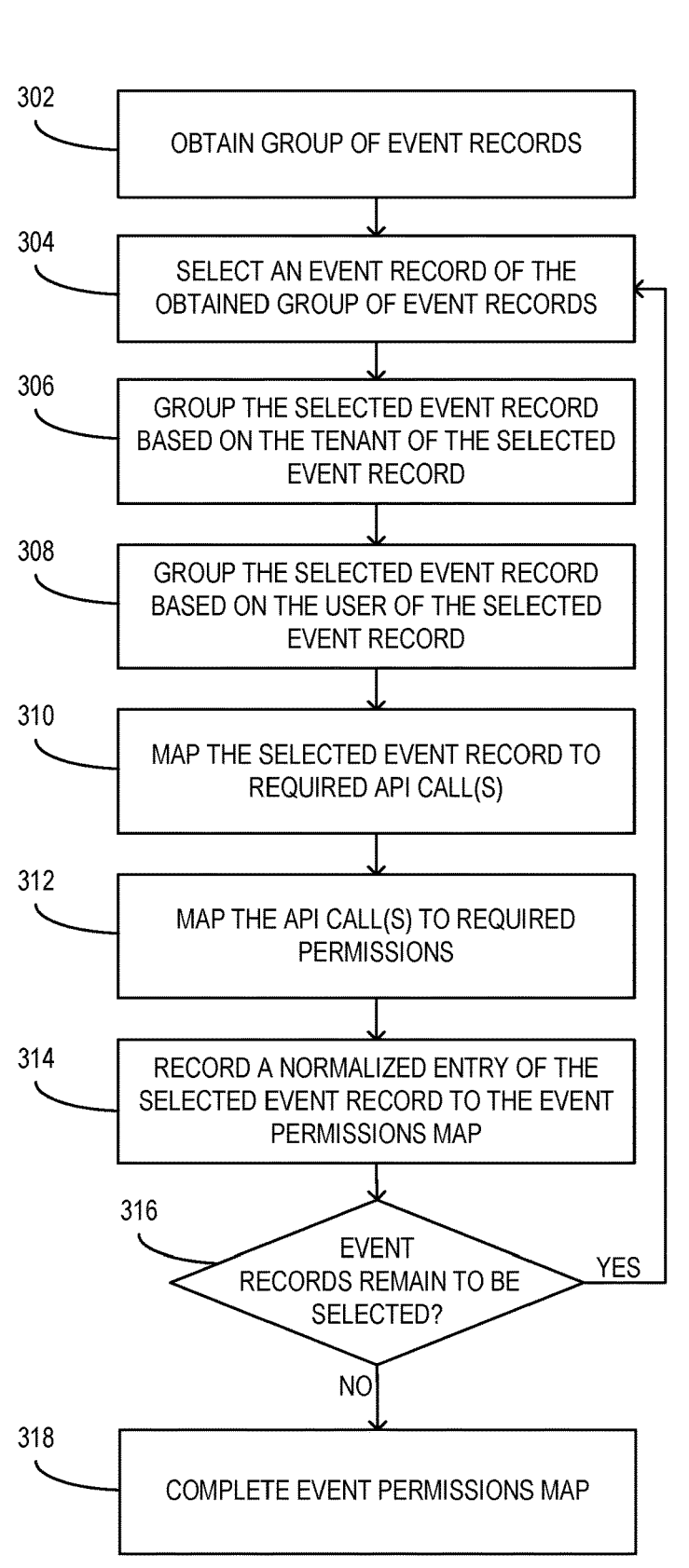

302 — OBTAIN GROUP OF EVENT RECORDS

304 — SELECT AN EVENT RECORD OF THE OBTAINED GROUP OF EVENT RECORDS

306 — GROUP THE SELECTED EVENT RECORD BASED ON THE TENANT OF THE SELECTED EVENT RECORD

308 — GROUP THE SELECTED EVENT RECORD BASED ON THE USER OF THE SELECTED EVENT RECORD

310 — MAP THE SELECTED EVENT RECORD TO REQUIRED API CALL(S)

312 — MAP THE API CALL(S) TO REQUIRED PERMISSIONS

314 — RECORD A NORMALIZED ENTRY OF THE SELECTED EVENT RECORD TO THE EVENT PERMISSIONS MAP

316 — EVENT RECORDS REMAIN TO BE SELECTED?          YES

NO

318 — COMPLETE EVENT PERMISSIONS MAP

FIG. 3

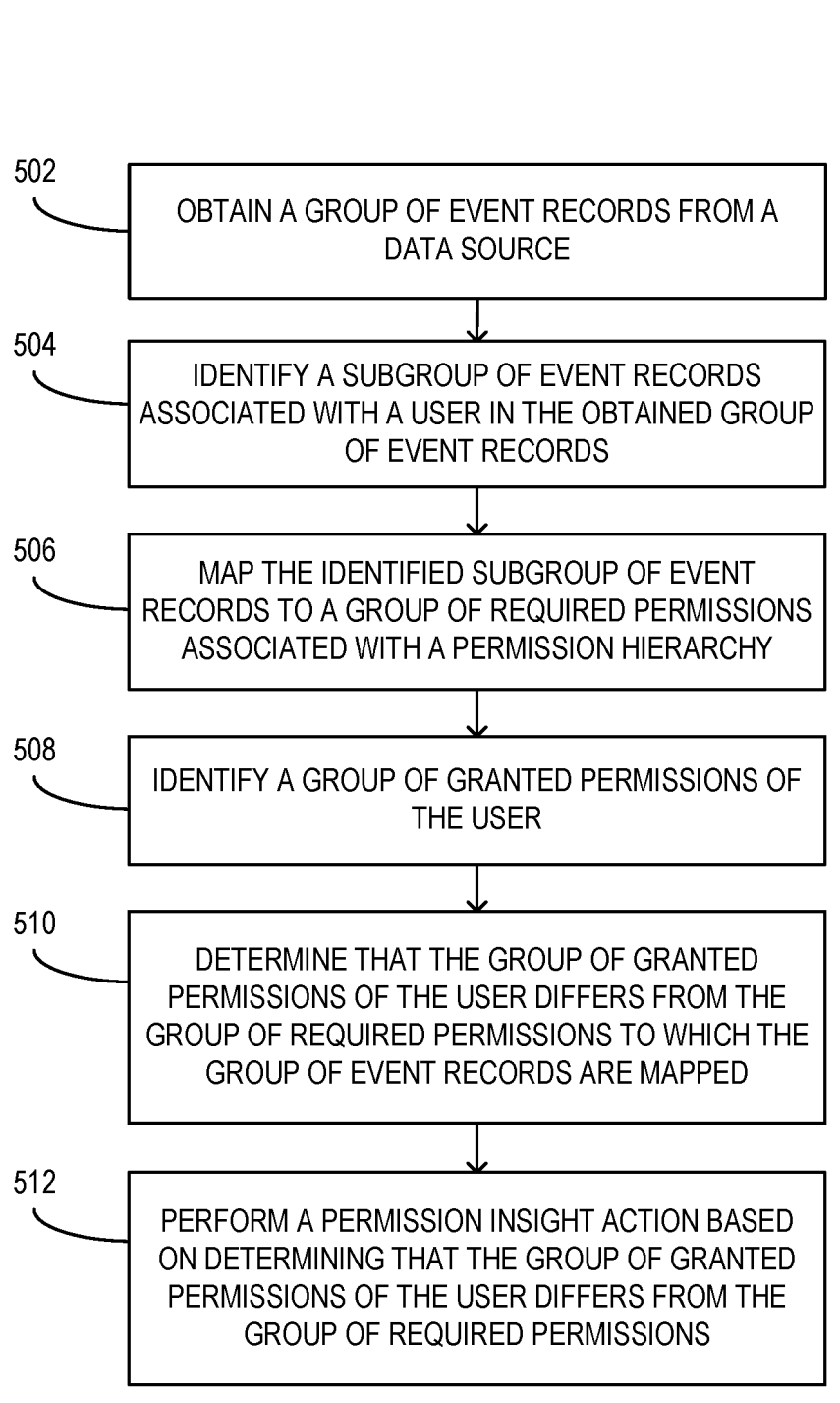

500

502 OBTAIN A GROUP OF EVENT RECORDS FROM A DATA SOURCE

504 IDENTIFY A SUBGROUP OF EVENT RECORDS ASSOCIATED WITH A USER IN THE OBTAINED GROUP OF EVENT RECORDS

506 MAP THE IDENTIFIED SUBGROUP OF EVENT RECORDS TO A GROUP OF REQUIRED PERMISSIONS ASSOCIATED WITH A PERMISSION HIERARCHY

508 IDENTIFY A GROUP OF GRANTED PERMISSIONS OF THE USER

510 DETERMINE THAT THE GROUP OF GRANTED PERMISSIONS OF THE USER DIFFERS FROM THE GROUP OF REQUIRED PERMISSIONS TO WHICH THE GROUP OF EVENT RECORDS ARE MAPPED

512 PERFORM A PERMISSION INSIGHT ACTION BASED ON DETERMINING THAT THE GROUP OF GRANTED PERMISSIONS OF THE USER DIFFERS FROM THE GROUP OF REQUIRED PERMISSIONS

FIG. 5

ANALYZING AGGREGATED EVENT DATA TO IDENTIFY AND ADDRESS PERMISSIONS ISSUES

BACKGROUND

Modern computing systems enable many different users to interact with them in many different ways, but the complexity of managing the permissions and privileges of those different users has also multiplied. Ensuring that all users have access to the operations and data they need in a computing system while also ensuring that they do not have permissions to access other operations and data that may result in a breach of security requires careful planning, attention to detail, and specialized knowledge of the computing system in many instances.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A computerized method for analyzing user permissions and identifying permission insights is described. A group of event records is obtained from a data source and a subgroup of event records associated with a user is identified in the obtained group of event records. The identified subgroup of event records is mapped to a group of required permissions using a permission hierarchy and a group of granted permissions of the user are identified. It is determined that the group of granted permissions of the user differs from the group of required permissions to which the subgroup of event records is mapped using the permission hierarchy. A permission insight action is performed based on determining that the group of granted permissions of the user differs from the group of required permissions.

BRIEF DESCRIPTION OF THE DRAWINGS

The present description will be better understood from the following detailed description read considering the accompanying drawings, wherein:

FIG. 3 is a flowchart illustrating an example method for generating an event permissions map;

FIG. 5 is a flowchart illustrating an example method for performing permission insight actions based on a difference between granted permissions and required permissions of a user.

Corresponding reference characters indicate corresponding parts throughout the drawings. In FIGS. 1 to 6, the systems are illustrated as schematic drawings. The drawings may not be to scale. Any of the figures may be combined into a single example or embodiment.

DETAILED DESCRIPTION

Figure 1:
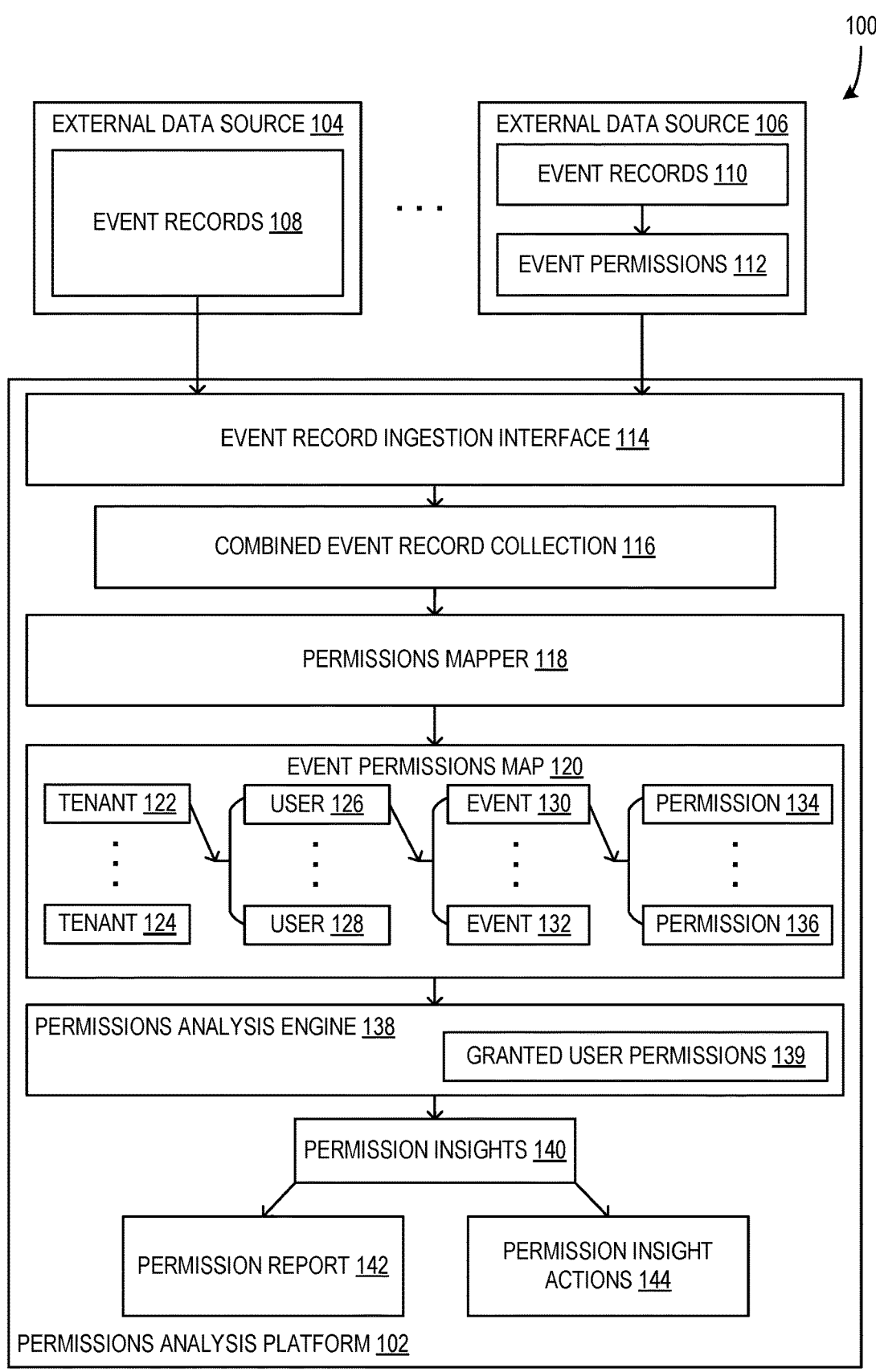
FIG. 1 is a block diagram illustrating an example system configured to analyze the permissions configuration in a computing system.

Aspects of the disclosure provide computerized methods and systems for collecting and aggregating event data, analyzing the permissions associated with the event data, and detecting or identifying permissions issues and/or insights in the computing system. For example, the permissions granted to users of the computing system are analyzed and compared to the permissions that are actually used by the user to perform actions or otherwise cause events to occur in the computing system. Differences between granted permissions and the permissions required for the user to interact with the computing system can represent weaknesses in the security of the system or other issues that are highlighted by the disclosed methods. The disclosure enables the collection of event records from a variety of different data sources and in a variety of different formats and those collected event records are then normalized into a consistent data structure so that they can be analyzed together, providing a comprehensive picture of the current state of the permissions configuration of the computing system. The disclosure further enables the definition of permission hierarchies and/or permission groupings that are used in the analysis and/or recommended for use as a result of generated permission insights.

The disclosure operates in an unconventional manner, at least by obtaining event record data for analysis from a variety of different external data sources. The disclosure enables the efficient collection of the event record data using multiple parallel ingestion threads such that event record data can be collected simultaneously from multiple different data sources. The ingestion interface of the disclosure is configured to manage such ingestion threads, including enabling the threads to form connections with different external data sources using different authentication methods and managing any issues associated with those connections, such as lost connections, handling multiple pages of data, or the like. By ingesting the event record data for analysis from multiple data sources using multiple parallel threads, the time required to complete the ingestion process is significantly reduced and the use of network resources and other resources can be efficiently managed by increasing or decreasing the quantity of active ingestion threads based on the current availability of such resources.

Further, the disclosure normalizes and organizes the data from those multiple data sources into a single data structure. This data structure enables the described analysis to be performed using all available data, ensuring that the most accurate sets of required permissions are determined and that any possible permissions issues are identified. The described organization of the aggregated event record data and associated permission data into an event permissions map enables the disclosed platform to perform the analysis using one overall process, rather than requiring piecemeal analyses of different types of event data. As a result, the disclosure enhances the rate at which a comprehensive analysis can be completed and reduces resource costs associated with doing multiple different types of analyses.

Additionally, the disclosure enables users to define permission hierarchies and/or permission groupings that are used during the described permissions analysis. This feature makes the disclosed methods and systems extremely flexible and accessible to a wide array of different types of computing system and/or associated users. The disclosed platform can be customized for efficient use with a wide variety of different systems, and it allows for users thereof to control for the types of permission insights that are generated and/or the types of permission insight actions that are taken.

FIG. 1 is a block diagram illustrating an example system 100 configured to analyze the permissions configuration in a computing system. In some examples, the permissions analysis platform 102 obtains event records from one or more external data sources 104-106 of the computing system or systems being analyzed. The event records are combined into a combined event record collection 116 and the events are processed to form an event permissions map 120. The event permissions map 120 is then analyzed to identify permissions insights 140, such as users that may have too many permissions, users that may have too few permissions, permission configurations that may expose the computing system(s) to security risks, or the like. Further, in some examples, the permissions analysis platform 102 generates a permission report 142 or otherwise causes a permission report 142 to be generated. Additionally, or alternatively, the permissions analysis platform 102 performs one or more permission insight actions 144 (e.g., changing the permissions granted to users, generating new roles or other permission groupings, or the like) based on the identified permission insights 140 or otherwise causes such permission insight actions 144 to be performed.

Further, in some examples, the system 100 includes one or more computing devices (e.g., the computing apparatus of FIG. 6) that are configured to communicate with each other via one or more communication networks (e.g., an intranet, the Internet, a cellular network, other wireless network, other wired network, or the like). In some examples, entities of the system 100 are configured to be distributed between the multiple computing devices and to communicate with each other via network connections. For example, the permissions analysis platform 102 is executed on a first computing device and the external data sources 104-106 are each located on other computing devices within the system 100. The first computing device and other computing devices are configured to communicate with each other via network connections. Alternatively, in some examples, components of the permissions analysis platform 102 (e.g., the permissions mapper 118 and the permissions analysis engine 138) are executed on separate computing devices and those separate computing devices are configured to communicate with each other via network connections during the operation of the permissions analysis platform 102. In other examples, other organizations of computing devices are used to implement system 100 without departing from the description.

In some examples, the permissions analysis platform 102 ingests or otherwise obtains event records 108-110 and/or event permissions 112 from external data sources 104-106 using an event record ingestion interface 114. The event record ingestion interface 114 includes hardware, firmware, and/or software configured to connect with the external data sources 104-106 over network connections, request or otherwise obtain the event records 108-110, event permissions 112, and/or other related data, and combine the obtained data into a combined event record collection 116. In some examples, the external data sources 104-106 include event records 108-110 in a variety of data formats, such as logs, event streams, or application programming interface (API) calls. The external data sources 104-106 include cloud service providers, API gateways, and/or other data sources that store information related to user API usage. In other examples, more, fewer, or different types of external data sources are used without departing from the description.

Further, in some examples, the event record ingestion interface 114 is configured to parallelize requests for event records 108-110 and other related data from the external data sources 104-106 using multiple threads. For instance, in an example, a first thread is used to request event records 108 from the external data source 104 and a second thread is used to request event records 110 and associated event permissions 112 from the external data source 106 at the same time or during overlapping time periods. Parallelizing the requests to external data sources 104-106 enables the event record ingestion interface 114 to increase performance of the data ingestion process and to enable the processing of errors, connection failures, retry-after requests, paging through multiple responses, and the like are handled individually per data source.

Additionally, or alternatively; the event record ingestion interface 114 is configured to handle any errors associated with communication with the external data sources 104-106, to exchange tokens for gaining access to the external data sources 104-106, and/or to collate data obtained over multiple requests from an external data source if necessary. The event record ingestion interface 114 is configured to enable connection to external data sources 104-106 through request clients, standard hypertext transfer protocol (HTTP) connections, or other types of connections such as service-to-service connections. The connection management includes handling authorization and authentication against external data sources, whether through token exchange on behalf of a user (e.g., a user account) associated with the permissions analysis platform 102 or through other authorization methods of the external source to which the event record ingestion interface 114 is connecting.

In some examples, the event record ingestion interface 114 is configured to ingest or otherwise obtain event permissions 112 and/or other associated with permissions from the external data sources 104-106. Further, in some such examples, the event permissions 112 are organized into a dictionary or other data structure in which an API call or other event are used as a key or index to the collection of permissions required to perform or otherwise cause the API call or other event (e.g., API call A indexes or maps to permissions collection B). Additionally, or alternatively, some or all of the permissions information used to populate the permissions dictionary is generated by a user of the permissions analysis platform 102, provided to the permissions analysis platform 102 in another way, and/or stored within the permissions analysis platform 102 for use with the ingested event records 108-110.

Further, in some examples, the event record ingestion interface 114 is configured to ingest, obtain, or otherwise process permissions data associated with a permissions hierarchy that is defined for the computing system being analyzed. In such examples, the permissions hierarchy defines relationships between individual permissions, including indicating when a first permission grants a subset of the permissions granted by a second permission. For instance, a directory-specific read permission grants a subset of the total permissions granted by a global read permission. In some examples, some or all of such hierarchy information is obtained from an external data source 104-106. Alternatively, or additionally, some or all of such hierarchy information is defined in or otherwise provided to the permissions analysis platform 102 (e.g., by a user of the permissions analysis platform 102).

Additionally, or alternatively, the event record ingestion interface 114 is configured to ingest, obtain, or otherwise process permission groupings in the same way as the permissions hierarchy data described above. A permission grouping is a defined collection of permissions that is identified with a unique identifier. Such a permission grouping can be assigned or granted to a user such that the user is considered to have all of the permissions in the defined collection of permissions. For instance, in an example, a permission grouping is defined that is associated with a specific user role in the computing system (e.g., a security administrator of a particular portion of the computing system has a collection of permissions that enable the performance of security administration tasks and operations without enabling actions to be performed in other portions of the computing system). In some such examples, some or all of these permission groupings are obtained from one or more of the external data sources 104-106. Alternatively, or additionally, in other examples, some or all permission groupings are defined or otherwise provided to the permissions analysis platform 102 by one or more users of the permissions analysis platform 102.

Further, in some examples, the event records 108-110 and/or event permissions 112 obtained by the event record ingestion interface 114 include permissions assigned to users in the computing system being analyzed. The permissions of users include a user identifier that maps to or is otherwise associated with a collection of permissions that have been granted to the user in the form of granted user permissions 139. In some such examples, the granted user permissions 139 are used by the permissions analysis engine 138 to identify potential permission insights 140 as described below.

The permissions mapper 118 includes hardware, firmware, and/or software configured to generate an event permissions map 120 from the combined event record collection 116 and/or other associated permissions data described herein. In some examples, the permissions mapper 118 is configured to order the combined event record collection 116 by tenant (e.g., tenants 122-124), wherein a tenant is an entity that has one or more users or users that make use of the computing system being analyzed. For instance, in an example, the computing system being analyzed provides a service to multiple tenants, each of which has a plurality of users that enable users of those tenants to access the provided service. It should be understood that, in other examples, the combined event record collection 116 is ordered by other types of groups of users without departing from the description.

Then, the combined event record collection is further ordered by user (e.g., users 126-128) within in each group of users of the ordered tenants 122-124. In some examples, this ordering includes iterating through all the event records 108-110 and adding each record to a dictionary nested within a dictionary to form the event permissions map 120. In other examples, other types of data structures are used without departing from the description. Thus, for each event record 108-110, the user that caused the event (e.g., the user from which and API call was made) is identified and the tenant with which the identified user is associated is identified. The event record is then placed in a dictionary associated with the identified user, which is nested in a dictionary associated with the identified tenant.

In some examples, the nested dictionaries of the event permissions map 120 are structured with unique key-value pairs, wherein the key values are identifiers of the tenant and user and the values are identifiers of the events, such that, in examples where multiple instances of the same event caused by the same user are present in the event records 108-110, that user-event pair is only added to the event permissions map 120 one time.

Additionally, in some examples, the generation of the event permissions map 120 includes determining the collection of permissions required to perform or activate each event and including those determined collections of permissions in the event permissions map 120. For instance, in an example, when event 130 is added to the event permissions map 120 in association with the tenant 122 and user 126, the permissions 134-136 are determined as a collection of permissions required to perform or otherwise cause the event 130 and the permissions 134-136 are then added to the event permissions map 120 in association with the event 130, as illustrated. Further, in some examples, the determination of the collection of permissions 134-136 for an event 130 in the event permissions map 120 is done using the permissions hierarchy described above, such that the collection of permissions 134-136 includes at least one permission and any other higher permissions in the hierarchy that include the at least one permission as a subset.

It should be understood that, in some examples, the users 126-128 refer to user accounts or the like that are used within the system being analyzed to access services provided by the system or otherwise interact with the system. Such users 126-128 are identified with user identifiers (IDs) that uniquely identify the users 126-128 within the system being analyzed. Further, the users 126-128 are associated with additional information such as granted permissions as described herein. In some such examples, users 126-128 are user accounts that can be signed into by people or other entities (e.g., an automated process may be enabled to sign in as a user to perform various automated operations).

Further, in some examples, the generation of the event permissions map 120 includes normalizing each event record of the combined event record collection 116 to conform with a standardized event record format, regardless of the type of the original event record. For instance, in an example, each event record is normalized into a data structure that includes an identifier of the event and a collection data structure that includes all permissions that are required for the event to be executed, performed, or otherwise caused. Additionally, or alternatively, a normalized event record data structure includes other data values, such as a Uniform Resource Identifier (URI), a verb associated with the event (e.g., different verbs used with the same URI, such as GET and POST events associated with HTTP), or the like. Further, in some examples, each normalized event record includes an indicator or indicators that indicate the minimum permissions required to perform or otherwise cause an event. For instance, in examples where the collection of permissions for an event includes permissions that are higher in the permissions hierarchy, the indicators in the event record are associated with the permissions that provide the lowest level of permissions required to still perform or cause the event.

When the event permissions map 120 is complete, maps each tenant 122-124 to a group of users 126-128 associated with that tenant, each user 126-128 to a group of events 130-132 that were executed by; performed by, or otherwise caused by that user, and each event 130-132 to a collection of permissions 134-136 that are required to execute, perform, or otherwise cause that event. Thus, the event permissions map 120 provides a comprehensive description of the permissions 134-136 required by each user 126-128 to perform the events 130-132 that they have previously performed as indicated by the event records 108-110.

The permissions analysis engine 138 includes hardware, firmware, and/or software configured to analyze the event permissions map 120, granted user permissions 139, and/or other related permissions information to identify permission insights 140 that may indicate security issues within the computing system being analyzed. In some examples, the permissions analysis engine 138 analyzes each user 126-128 of each tenant 122-124 in the event permissions map 120 to identify users that are overprivileged and/or underprivileged. For instance, an overprivileged user is identified by comparing, for a user 126-128, the permissions 134-136 required for each event 130-132 of that user to the granted user permissions 139 associated with the user and determining that the granted user permissions 139 include one or more permissions that are not required for the user to execute, perform, or otherwise cause the events 130-132 of the user in the event permissions map 120. Alternatively, if the comparison indicates that the user requires one or more permissions 134-136 to perform the events 130-132 that are not present in the granted user permissions 139 of the user, that user may be underprivileged. Further, in some examples, overprivileged users are identified by determining that they have been granted permissions that are higher in the defined permission hierarchy than would be necessary to perform the associated events 130-132.

Overprivileged users and underprivileged users are both permission insights 140 identified by the permissions analysis engine 138. In other examples, other permission insights 140 are identified by the permissions analysis engine 138, such as redundant permissions, permissions that are not being used, permissions that have not been granted to any users, or the like. Patterns of granted permissions are also analyzed to detect permission insights that might represent security risks and/or security threats for the computing system being analyzed.

Further, in some examples, permission groupings, such as roles, have been defined for use with the permissions of the computing system being analyzed. In some such examples, granted user permissions 139 for each user 126-128 are based on those defined permission groupings and the permissions analysis engine 138 is configured to analyze the permissions of the users 126-128 using those defined permission groupings. For instance, for a user 126, the permissions analysis engine 138 identifies a permission grouping of the defined permission groupings that includes the minimum permissions for the user 126 to perform the events 130-132 with which the user is associated. This identified permission grouping is compared to the granted user permissions 139 of the user 126 to determine whether the user 126 is overprivileged or underprivileged. In some such examples, the granted user permissions 139 include indicators that indicate permission grouping to which each user 126-128 is assigned and the permissions analysis engine 138 compares those indicators to identified permission groupings from the event permissions map 120 to determine whether users 126-128 are overprivileged or underprivileged.

In some examples, the permissions analysis platform 102 is configured to generate a permission report 142 based on any permission insights 140 that are generated by the permissions analysis engine 138. The permission report 142 includes information associated with any possible overprivileged and/or underprivileged users, as well as information associated with other permission insights 140. Further, in some such examples, the permission report 142 includes information associated with other patterns that are detected during the permissions analysis, such as indicators of potential security risks and/or possible methods for optimizing resource allocation in the analyzed computing system. Additionally, or alternatively, the permission report 142 is consumable from the permissions analysis platform 102 using a representational state transfer (REST) web API or another stateful API. The call structure is formatted as a function bound to an individual tenant 122-124, or an unbound function that operates on all tenants for which the caller of the API has valid authentication to view the associated data. Further, it should be understood that the reportion module of the permissions analysis platform 102 is configured to send HTTP responses back to senders, serialize the content per the content-type headers of requests, and other types of request processing.

Additionally, in some examples, queries for permission reports 142 include options such as date range restrictions or other filtering which are handled by the reporting module of the permissions analysis platform 102. For instance, in an example where a report is requested for a specific tenant over a date range, the permissions analysis platform 102 is configured to use the included tenant ID and date range to restrict the data ingested or obtained by the event record ingestion interface 114 such that the resulting permission insights 140 are limited to the requested tenant and to event records 108-110 that fall within the requested date range.

In some examples, the permissions analysis platform 102 is configured to execute or otherwise perform permission insight actions 144 based on the permission insights 140. For instance, in some examples, the permissions analysis platform 102 is configured to cause the permissions granted to a user to be reconciled based on determining that the user is overprivileged or underprivileged. If the user is found to be overprivileged, the permission insight action 144 performed by the permissions analysis platform 102 includes causing the granted user permissions 139 of the user to be adjusted to remove permissions that are unnecessary or that grant too many privileges for the events 130-132 associated with the user. Alternatively, if the user is found to be underprivileged, the permission insight action 144 performed by the permissions analysis platform 102 includes causing the granted user permissions 139 of the user to be adjusted to add permissions that are necessary for the events 130-132 associated with the user. It should be understood that, in some such examples, the permissions analysis platform 102 does not have direct control over granted user permissions in the computing system being analyzed and, as a result, the described permission insight actions 144 include sending notifications and/or instructions to the computing system that indicate adjustments to be made to the granted user permissions therein. In some such examples, the permissions analysis platform 102 only performs such permission insight actions 144 if granted the ability to do so by administrators of the computing system being analyzed.

Further, in some examples, permission insight actions 144 include changing permission groupings assigned to users, identifying security risks or threats in the computing system, and performing operations thereon to address the identified security risks or threats, performing operations to optimize resource allocation in the computing system, inferring accurate permissions for users and generating recommendations based thereon for inclusion in the permission report 142, or the like.

Figure 2:
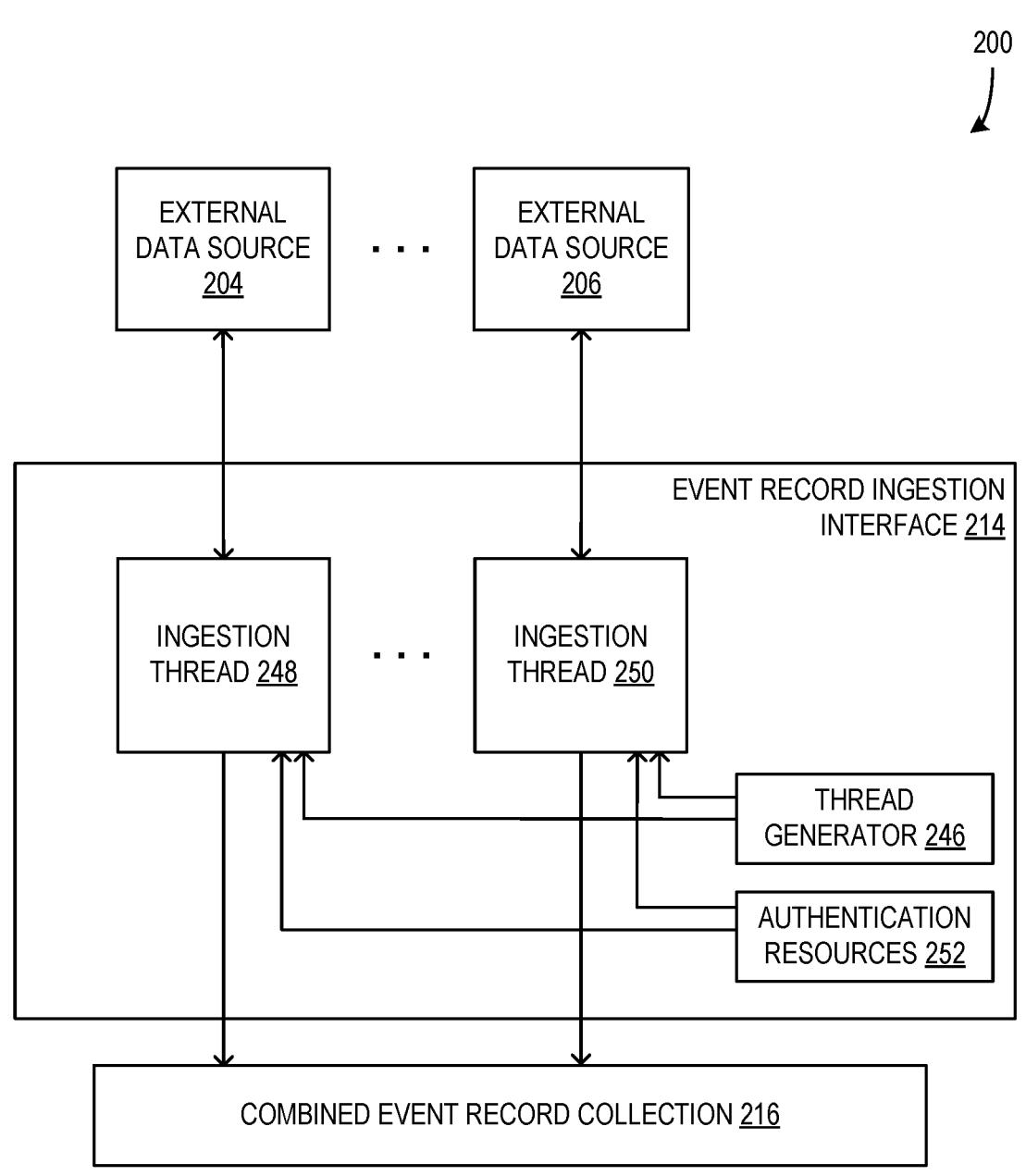
FIG. 2 is a block diagram illustrating an example system configured to ingest data from external data sources using multiple parallel threads.

FIG. 2 is a block diagram illustrating an example system 200 configured to ingest data (e.g., event records 108-110 and/or event permissions 112) from external data sources 204-206 using multiple parallel threads 248-250. In some examples, the system 200 is part of or otherwise associated with a system like system 100 of FIG. 1.

The event record ingestion interface 214 uses a thread generator 246 to generate or otherwise create ingestion threads 248-250. The ingestion threads 248-250) are configured to connect to external data sources 204-206 and to ingest or otherwise obtain data from those external data sources 204-206 (e.g., via sending requests to the external data sources 204-206 and receiving responses including the requested data). In some examples, the event record ingestion interface 214 creates a quantity of ingestion threads 248-250 that meets or exceeds the quantity of external data sources 204-206 from which data is to be ingested. Alternatively, or additionally, the event record ingestion interface 214 controls the quantity of active ingestion threads 248-250 based on available system resources and/or demand for permissions analysis by users of an associated permissions analysis platform (e.g., permissions analysis platform 102).

Further, in some examples, the ingestion threads 248-250 are configured to establish authentication with the connected external data sources 204-206 using authentication resources 252. In some such examples, the authentication of ingestion thread connections to external data sources includes exchanging authentication tokens. Additionally, or alternatively, the ingestion threads 248-250 are configured to handle connection retries and/or other errors associated with the network connections with the external data sources 204-206.

In some examples, the ingestion threads 248-250 are further configured to record or otherwise write the data ingested or obtained from the external data sources 204-206 to the combined event record collection 216, which stores the event records and associated data in preparation for the generation of an event permissions map (e.g., event permissions map 120) as described herein.

It should be understood that the event record ingestion interface 214 includes hardware, firmware, and/or software configured to enable the event record ingestion interface 214 to manage multiple ingestion threads 248-250 that are executed in parallel or substantially at the same time. Further, the event record ingestion interface 214 is configured to create and begin the execution of ingestion threads 248-250 and/or halt the execution of and remove ingestion threads 248-250 during operation of the system 200 (e.g., in response to more resources becoming available or completion of operations by some ingestion threads).

FIG. 3 is a flowchart illustrating an example method 300 for generating an event permissions map (e.g., event permissions map 120). In some examples, the method 300 is executed or otherwise performed by or in association with a system such as system 100 of FIG. 1.

At 302, a group of event records are obtained. In some examples, the group of event records are obtained from external data sources by an event record ingestion interface as described herein.

At 304, an event record of the obtained group of event record is selected. At 306, the selected event record is grouped based on the tenant of the selected event record and, at 308, the selected event record is grouped based on the user of the selected event record. In some examples, the group of an event record includes mapping the combination of the tenant and user of the selected event record to an identifier of the event record.

At 310, the selected event record is mapped to the required API calls of the associated event. For instance, in an example, an event record is associated with an event that requires three different API calls to execute. If one or more of the three API calls has different required permissions than the other API calls, it is necessary to map the event record to each of the API calls. Thus, the total required permissions for executing or otherwise causing the event with which the event record is associated can be determined.

At 312, the API calls of the event record are mapped to the required permissions thereof. In some examples, the selected event record is mapped to a collection data structure with entries for each of the mapped API calls. Then, each entry in the API call collection data structure includes a collection data structure for storing the required permissions for that particular API call. The result is a nested data structure of collection data structures for mapping the selected event record to each required permission via the intermediate API calls associated with the event.

At 314, a normalized entry of the selected event record is recorded to the event permissions map. In some examples, the normalized entry includes a tenant identifier that maps to a user identifier, which maps to an event identifier, which maps to a collection of required permissions (e.g., permissions 134-136). Further, in some examples, the event permissions map includes a tenant identifier (e.g., tenant 122) that maps to a collection of user identifiers (e.g., users 126-128). Each of the user identifiers in the collection then maps to a collection of events (e.g., events 130-132). Each of the events then maps to a collection of required permissions (e.g., permissions 134-136). In such examples, the recording of the normalized entry to the event permissions map includes populating the collections of the event permissions map as described herein. Additionally, by recording the entry of the selected event record in the event permissions map as described herein, the data of the selected event record is normalized or otherwise converted into a standard format to fit into the data structure of the event permissions map.

At 316, if event records remain to be selected in the obtained group of event records, the process returns to 304 to select another event record. Alternatively, if no event records remain to be selected in the obtained group of event records, the process proceeds to 318, at which point the event permissions map is complete.

Figure 4:
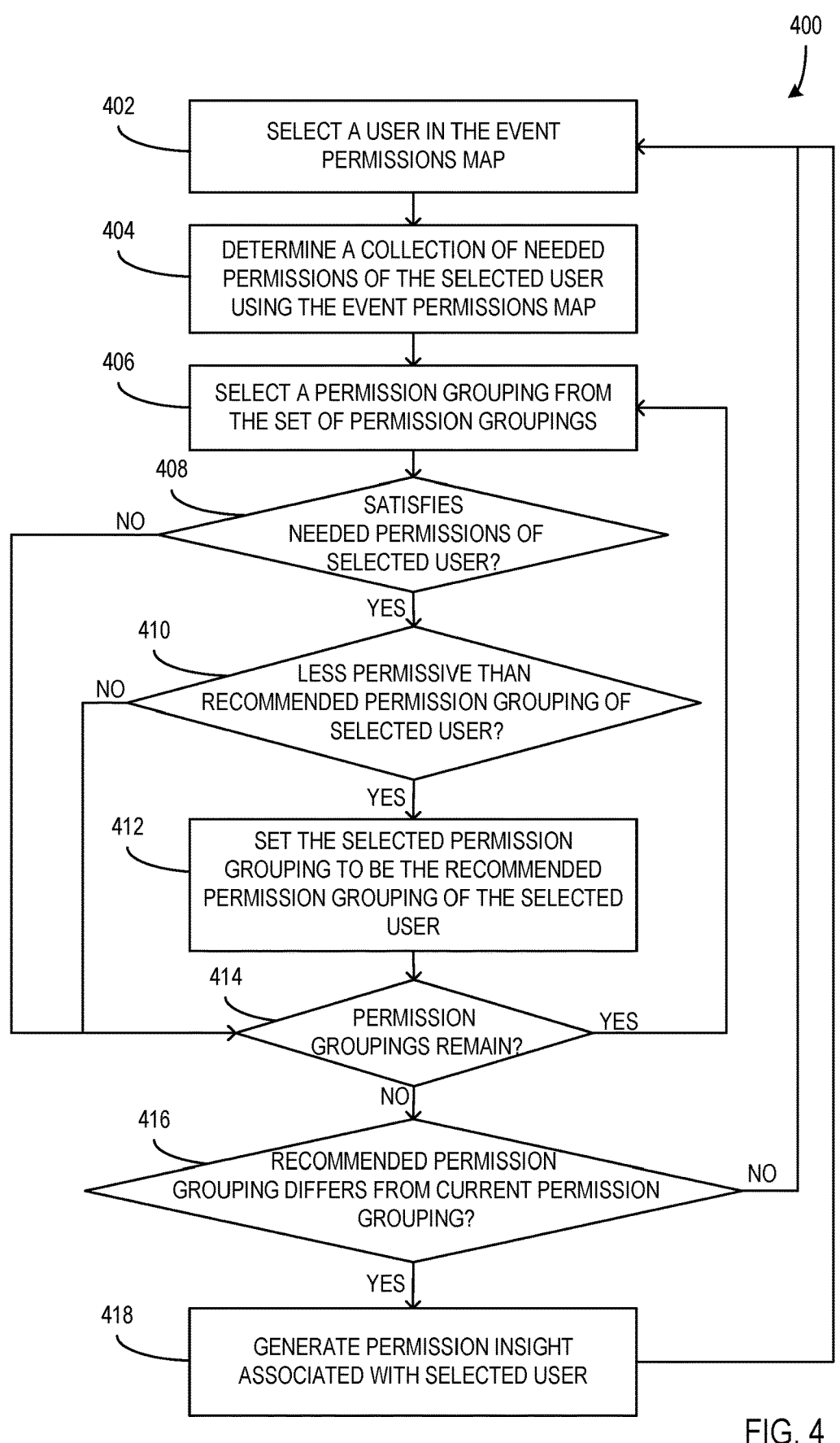
FIG. 4 is a flowchart illustrating an example method for generating permission insights associated with permission groupings of users.

FIG. 4 is a flowchart illustrating an example method 400 for generating permission insights (e.g., permission insights 140) associated with permission groupings of users (e.g., users 126-128). In some examples, the method 400 is executed or otherwise performed by or in association with a system such as system 100 of FIG. 1.

At 402, a user in the event permission map is selected and, at 404, a collection of needed permissions of the selected user is determined using the event permissions map. In some examples, the determination of the of the collection of needed permissions includes accessing the collection of events (e.g., events 130-132) associated with the selected user and then accessing the collections of needed permissions (e.g., permissions 134-136) in the event permissions map (e.g., event permissions map 120).

At 406, a permission grouping is selected from the set of possible permission groupings. At 408, if the selected permission grouping satisfies the needed permissions of the selected user, the process proceeds to 410. Alternatively, if the selected permission grouping does not satisfy the needed permissions of the selected user, the process proceeds to 414. In some examples, the set of permission groupings are a defined set of permission groupings and users are enabled to be assigned to one permission grouping of the set of permission groupings. Alternatively, in other examples, a user can be assigned to multiple permission groupings of the set of permission groupings. In such examples, selecting a permission grouping from the set of permission groupings includes selecting composite permission groupings that are combinations of more than one of the defined permission groupings such that combinations of multiple permission groupings are tested for permissiveness and satisfaction of the needed permissions of the selected user as described herein.

At 410, if the selected permission grouping is less permissive than a recommended permission grouping of the selected user, the process proceeds to 412. Alternatively, if the selected permission grouping is not less permissive than the recommended permission grouping of the selected user, the process proceeds to 414. In examples where a first recommended permission grouping has not been established, the process proceeds to 412. Further, in some examples, a first permission grouping is found to be less permissive than a second permission grouping if it lacks a permission that is in the second permission grouping and/or includes a permission that allows for fewer privileges than a permission that is present in the second permission grouping but not in the first permission grouping. For instance, in an example, if the first permission grouping includes a first permission in a defined permission hierarchy and the second permission grouping includes a second permission in the defined permission hierarchy and the second permission is higher in the permission hierarchy than the first permission and therefore provides more privileges than the first permission, the first permission grouping is less permissive than the second permission grouping. In other examples, the permissiveness of permission groupings is determined in other ways without departing from the description.

At 412, the selected permission grouping is set to be the recommended permission grouping of the selected user.

At 414, if permission groupings remain, the process returns to 406, at which point another permission grouping is selected. Alternatively, if no permission groupings remain, the process proceeds to 416.

At 416, if the recommended permission grouping differs from the current permission grouping assigned to the selected user, the process proceeds to 418. Alternatively, if the recommended permission grouping does not differ from the current permission grouping assigned to the selected user, the process returns to 402 to select another user from the event permissions map if there are users that remain to be selected.

At 418, a permission insight is generated in association with the selected user. In some examples, the permission insight indicates that the user is overprivileged (e.g., the recommended permission grouping has fewer privileges than the current permission grouping). Alternatively, in some examples, the permission insight indicates that the user is underprivileged (e.g., the recommended permission grouping has more privileges than the current permission grouping).

FIG. 5 is a flowchart illustrating an example method 500 for performing permission insight actions (e.g., permission insight actions 144) based on a difference between granted permissions (e.g., granted user permissions 139) and required permissions (e.g., permissions 134-136) of a user. In some examples, the method 500 is executed or otherwise performed by or in association with a system such as system 100 of FIG. 1.

At 502, a group of event records is obtained from a data source. In some examples, the group of event records is obtained from a plurality of external data sources (e.g., external data sources 104-106). Further, the event records include information about events that have occurred on the system being analyzed, such as log entries that were recorded when the event occurred, API calls that triggered the events or are otherwise associated with the events, or the like. Additionally, or alternatively, in some examples, obtaining the group of event records includes obtaining other related information, such as event permissions data (e.g., event permissions 112).

Further, in some examples, the group of event records are obtained from multiple external data sources via an event record ingestion interface (e.g., event record ingestion interfaces 114 and/or 214) using a plurality of parallel ingestion threads (e.g., ingestion threads 248-250) as described herein.

At 504, a subgroup of event records associated with a user is identified in the obtained group of event records. In some examples, the subgroup of event records is identified by searching for event records that are associated with a user identifier of the user. Alternatively, or additionally, in some examples, after the group of event records are obtained, they are normalized and/or organized to form a map or other data structure that links each event record to a user with which the event record is associated. For instance, in an example, the permission mapper 118 generates the event permissions map 120 from the combined event record collection 116 as described herein. When such a data structure is completed, the identification of the event records associated with a user includes finding the user within the data structure and then accessing the event records in the event record collection to which the user is mapped.

At 506, the event records of the identified subgroup of event records are mapped to a group of required permissions using a permission hierarchy. In some examples, the mapping of the event records to the required permissions is performed using the defined permission hierarchy, which includes associations between specific permissions and the types of events, API calls, or the like that those specific permissions enable or allow. Further, in some examples, an interface is provided to a user that enables the user to define the permission hierarchy to be used. When such a user-defined permission hierarchy is received via the provided interface, the mapping of the event records to the required permissions is performed using the user-defined permission hierarchy as described herein.

Additionally, or alternatively, in some examples, the mapping includes generating an event permission map as described herein. The event permission map generation includes mapping a user identifier of the user to an event collection data structure; populating the event collection data structure with event entries associated with the subgroup of event records associated with the user; mapping each event entry of the event collection data structure to a required permission data structure; and populating each required permission collection data structure with the group of required permissions as described herein.

At 508, a group of granted permissions of the user is identified. In some examples, the group of granted permissions is associated with the user within a permissions management component of the system being analyzed. Further, in some examples, the group of granted permissions of the user is based on one or more permission groupings (e.g., roles within the system being analyzed) that have been assigned to the user.

At 510, it is determined that the group of granted permissions of the user differs from the group of required permissions to which the subgroup of event records is mapped. In some examples, the user is found to be overprivileged when the group of granted permissions exceeds or is otherwise higher in the permission hierarchy than the group of required permissions. Alternatively, in some examples, the user is found to be underprivileged when the group of required permissions exceeds or is otherwise higher in the permission hierarchy than the group of granted permissions. In each case, a permission insight (e.g., a permission insight 140) is generated in association with the user based on the mismatch between granted and required permissions. Additionally, it should be understood that, in some examples, the user is both overprivileged with respect to some permissions and underprivileged with respect to other permissions.

At 512, a permission insight action is performed based on determining that the group of granted permissions of the user differs from the group of required permissions. In some examples, the permission insight action includes generating a permission report that includes information associated with the group of granted permissions of the user and the group of required permissions. For instance, in an example, the report includes an indicator that the user has inefficiently granted permissions, such as a message that notifies an observer that the user is either overprivileged or underprivileged. In other examples, other types of information are included in the generated permission report without departing from the description.

Alternatively, or additionally, in some examples, the performance of the permission insight action includes sending instructions for changing permissions of the user to the system that is being analyzed. For instance, if it is determined that the user is overprivileged, instructions are sent to the system being analyzed that indicate changes that can be made to the granted permissions of the user reduce the user's privileges to meet the required permissions. Alternatively, if it is determined that the user is under privileged, instructions are sent to the system being analyzed that indicate changes that can be made to the granted permissions of the user to increase the user's privileges to meet the required permissions. Further, in some examples, such permission insight actions include generating one or more recommended permission groupings that are sent to the system being analyzed. Thus, the system being analyzed is enabled to efficiently adjust the permissions of the user in response to received instructions and/or recommendations.

Additional Examples

In an example, a permissions analysis engine detects a plurality of overprivileged users and underprivileged users in the system being analyzed. The permissions analysis engine generates a permission report that includes information about the detected plurality of overprivileged users and under privileged users.

In another example, the permissions analysis engine detects an overprivileged user in the system being analyzed. The permissions analysis engine automatically revokes permissions from the overprivileged user to prevent the user from being overprivileged. In some such examples, the permissions analysis engine also generates a permission report that includes information about the automatic revocation of permissions for the user.

In another example, the permissions analysis engine detects an underprivileged user in the system being analyzed. The permissions analysis engine temporarily grants the permissions needed for the user to no longer be underprivileged and a permission report is generated that includes information about the automatic granting of permissions to the user. Further, the permission report prompts an administrator to confirm that the temporarily granted permissions should be permanently granted for the user.

In another example, the permissions analysis engine detects that an overprivileged user is overprivileged based on being part of a user group for which a set of permissions are granted. The permissions analysis engine automatically removes the overprivileged user from the user group. In some such examples, a permission report is generated including information about the automatic removal of the user from the user group.

In another example, the permissions analysis engine detects a permission that has not been granted to any users within the system. The permissions analysis engine generates a report including information about the unused permission and a recommendation to remove the permission from the system configuration.

In another example, the permissions analysis engine detects two permissions in the system that grant the same permissions to associated users. The permissions analysis engine generates a report including information about the redundant permissions and a recommendation to merge the two redundant permissions into a single permission. Further, in some such examples, the permissions analysis engine automatically merges the redundant permissions into one permission.

In another example, the permissions analysis engine detects a security risk to the system by analyzing permissions granted to a group of users. The permissions analysis engine generates a report including information about the detected security risk. Further, in some examples, the permissions analysis engine temporarily revokes privileges from the group of users to prevent the detected security risk from being exploited while it is evaluated by administrators.

Exemplary Operating Environment

Figure 6:
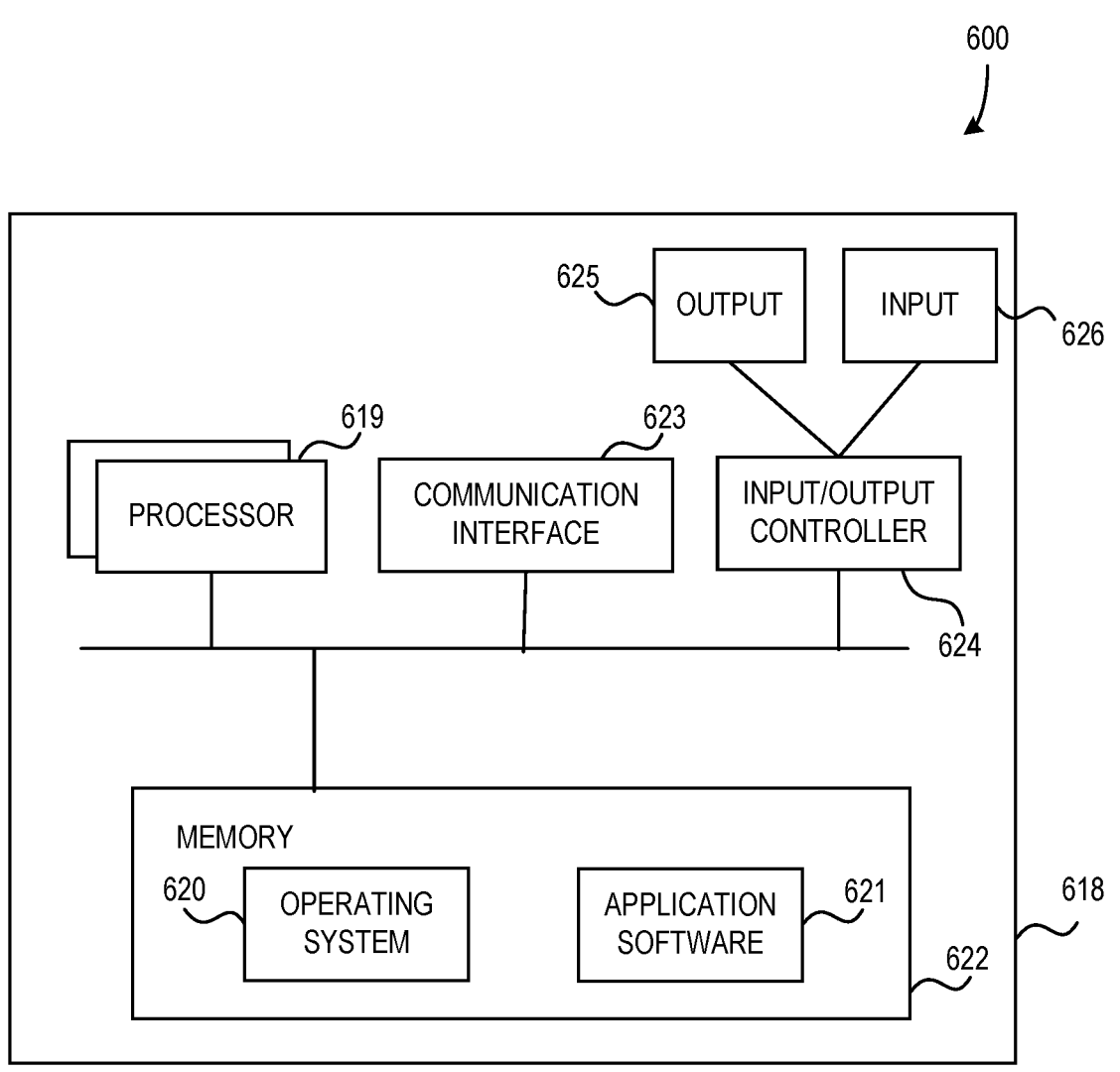
FIG. 6 illustrates an example computing apparatus as a functional block diagram.

The present disclosure is operable with a computing apparatus according to an embodiment as a functional block diagram 600 in FIG. 6. In an example, components of a computing apparatus 618 are implemented as a part of an electronic device according to one or more embodiments described in this specification. The computing apparatus 618 comprises one or more processors 619 which may be microprocessors, controllers, or any other suitable type of processors for processing computer executable instructions to control the operation of the electronic device. Alternatively, or in addition, the processor 619 is any technology capable of executing logic or instructions, such as a hard-coded machine. In some examples, platform software comprising an operating system 620 or any other suitable platform software is provided on the apparatus 618 to enable application software 621 to be executed on the device. In some examples, analyzing permissions configurations and identifying users with inefficiently assigned permissions as described herein is accomplished by software, hardware, and/or firmware.

In some examples, computer executable instructions are provided using any computer-readable media that is accessible by the computing apparatus 618. Computer-readable media include, for example, computer storage media such as a memory 622 and communications media. Computer storage media, such as a memory 622, include volatile and non-volatile, removable, and non-removable media implemented in any method or technology for storage of information such as computer readable instructions, data structures, program modules or the like. Computer storage media include, but are not limited to, Random Access Memory (RAM), Read-Only Memory (ROM), Erasable Programmable Read-Only Memory (EPROM), Electrically Erasable Programmable Read-Only Memory (EEPROM), persistent memory, phase change memory, flash memory or other memory technology, Compact Disk Read-Only Memory (CD-ROM), digital versatile disks (DVD) or other optical storage, magnetic cassettes, magnetic tape, magnetic disk storage, shingled disk storage or other magnetic storage devices, or any other non-transmission medium that can be used to store information for access by a computing apparatus. In contrast, communication media may embody computer readable instructions, data structures, program modules, or the like in a modulated data signal, such as a carrier wave, or other transport mechanism. As defined herein, computer storage media does not include communication media. Therefore, a computer storage medium should not be interpreted to be a propagating signal per se. Propagated signals per se are not examples of computer storage media. Although the computer storage medium (the memory 622) is shown within the computing apparatus 618, it will be appreciated by a person skilled in the art, that, in some examples, the storage is distributed or located remotely and accessed via a network or other communication link (e.g., using a communication interface 623).

Further, in some examples, the computing apparatus 618 comprises an input/output controller 624 configured to output information to one or more output devices 625, for example a display or a speaker, which are separate from or integral to the electronic device. Additionally, or alternatively, the input/output controller 624 is configured to receive and process an input from one or more input devices 626, for example, a keyboard, a microphone, or a touchpad. In one example, the output device 625 also acts as the input device. An example of such a device is a touch sensitive display. The input/output controller 624 may also output data to devices other than the output device, e.g., a locally connected printing device. In some examples, a user provides input to the input device(s) 626 and/or receives output from the output device(s) 625.

The functionality described herein can be performed, at least in part, by one or more hardware logic components. According to an embodiment, the computing apparatus 618 is configured by the program code when executed by the processor 619 to execute the embodiments of the operations and functionality described. Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Program-specific Standard Products (ASSPs), System-on-a-chip systems (SOCs), Complex Programmable Logic Devices (CPLDs), Graphics Processing Units (GPUs).

At least a portion of the functionality of the various elements in the figures may be performed by other elements in the figures, or an entity (e.g., processor, web service, server, application program, computing device, or the like) not shown in the figures.

Although described in connection with an exemplary computing system environment, examples of the disclosure are capable of implementation with numerous other general purpose or special purpose computing system environments, configurations, or devices.

Examples of well-known computing systems, environments, and/or configurations that are suitable for use with aspects of the disclosure include, but are not limited to, mobile or portable computing devices (e.g., smartphones), personal computers, server computers, hand-held (e.g., tablet) or laptop devices, multiprocessor systems, gaming consoles or controllers, microprocessor-based systems, set top boxes, programmable consumer electronics, mobile telephones, mobile computing and/or communication devices in wearable or accessory form factors (e.g., watches, glasses, headsets, or earphones), network PCs, minicomputers, mainframe computers, distributed computing environments that include any of the above systems or devices, and the like. In general, the disclosure is operable with any device with processing capability such that it can execute instructions such as those described herein. Such systems or devices accept input from the user in any way, including from input devices such as a key board or pointing device, via gesture input, proximity input (such as by hovering), and/or via voice input.

Examples of the disclosure may be described in the general context of computer-executable instructions, such as program modules, executed by one or more computers or other devices in software, firmware, hardware, or a combination thereof. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions, or the specific components or modules illustrated in the figures and described herein. Other examples of the disclosure include different computer-executable instructions or components having more or less functionality than illustrated and described herein.

In examples involving a general-purpose computer, aspects of the disclosure transform the general-purpose computer into a special-purpose computing device when configured to execute the instructions described herein.

An example system comprises a processor; and a memory comprising computer program code, the memory and the computer program code configured to cause the processor to: obtain a group of event records from a data source; identify a subgroup of event records associated with a user in the obtained group of event records; map the identified subgroup of event records to a group of required permissions using a permission hierarchy; identify a group of granted permissions of the user; determine that the group of granted permissions of the user differs from the group of required permissions to which the subgroup of event records are mapped; and perform a permission insight action based on determining that the group of granted permissions of the user differs from the group of required permissions.

An example computerized method comprises obtaining a group of event records from a data source; identifying a subgroup of event records associated with a user in the obtained group of event records; mapping the identified subgroup of event records to a group of required permissions using a permission hierarchy; identifying a group of granted permissions of the user; determining that the group of granted permissions of the user is more permissive than the group of required permissions to which the subgroup of event records are mapped using the permission hierarchy; and performing a permission insight action based on determining that the group of granted permissions of the user is more permissive than the group of required permissions.

One or more computer storage media having computer-executable instructions that, upon execution by a processor, case the processor to at least: obtain a group of event records from a data source; identify a subgroup of event records associated with a user in the obtained group of event records; map the identified subgroup of event records to a group of required permissions using a permission hierarchy; identify a group of granted permissions of the user; determine that the group of granted permissions of the user is less permissive than the group of required permissions to which the subgroup of event records are mapped using the permission hierarchy; and perform a permission insight action based on determining that the group of granted permissions of the user is less permissive than the group of required permissions.

Alternatively, or in addition to the other examples described herein, examples include any combination of the following:

wherein obtaining the group of event records includes obtaining event records from a plurality of data sources using a plurality of parallel data ingestion threads.

wherein performing the permission insight action includes generating a permission report including information associated with the group of granted permissions of the user and the group of required permissions.

wherein performing the permission insight action includes sending instructions for changing permissions of the user to a system with which the data source is associated.

further comprising: providing an interface for receiving a user-defined permission hierarchy; and receiving the permission hierarchy via the provided interface.

wherein mapping the identified subgroup of event records to the group of required permissions associated with the permission hierarchy includes generating an event permission map, including: mapping a user identifier of the user to an event collection data structure; populating the event collection data structure with event entries associated with the subgroup of event records associated with the user; mapping each event entry of the event collection data structure to a required permission collection data structure; and populating each required permission collection data structure with the group of required permissions.

wherein identifying the group of granted permissions of the user includes identifying granted permissions of a current permission grouping that is assigned to the user; wherein determining that the group of granted permissions of the user differs from the group of required permissions to which the subgroup of event records are mapped further includes determining a recommended permission grouping that includes the group of required permissions; and wherein performing the permission insight action includes generating a recommendation indicating the recommended permission grouping in association with the user.

Any range or device value given herein may be extended or altered without losing the effect sought, as will be apparent to the skilled person.

Examples have been described with reference to data monitored and/or collected from the users (e.g., user identity data with respect to profiles). In some examples, notice is provided to the users of the collection of the data (e.g., via a dialog box or preference setting) and users are given the opportunity to give or deny consent for the monitoring and/or collection. The consent takes the form of opt-in consent or opt-out consent.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The embodiments illustrated and described herein as well as embodiments not specifically described herein but within the scope of aspects of the claims constitute an exemplary means for obtaining a group of event records from a data source; exemplary means for identifying a subgroup of event records associated with a user in the obtained group of event records; exemplary means for mapping the identified subgroup of event records to a group of required permissions using a permission hierarchy; exemplary means for identifying a group of granted permissions of the user; exemplary means for determining that the group of granted permissions of the user differs from the group of required permissions to which the subgroup of event records are mapped using the permission hierarchy; and exemplary means for performing a permission insight action based on determining that the group of granted permissions of the user differs from the group of required permissions.

The term "comprising" is used in this specification to mean including the feature(s) or act(s) followed thereafter, without excluding the presence of one or more additional features or acts.

In some examples, the operations illustrated in the figures are implemented as software instructions encoded on a computer readable medium, in hardware programmed or designed to perform the operations, or both. For example, aspects of the disclosure are implemented as a system on a chip or other circuitry including a plurality of interconnected, electrically conductive elements.

The order of execution or performance of the operations in examples of the disclosure illustrated and described herein is not essential, unless otherwise specified. That is, the operations may be performed in any order, unless otherwise specified, and examples of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the examples thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of." The phrase "one or more of the following: A, B, and C" means "at least one of A and/or at least one of B and/or at least one of C."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system comprising:

a processor; and a memory comprising computer program code, the memory and the computer program code configured to cause the processor to:

obtain a group of event records in parallel from a plurality of data sources through a plurality of parallel data ingestion threads, the group of event records being stored in a plurality of different data formats of the plurality of data sources;

identify a subgroup of event records associated with a user in the obtained group of event records;

normalize the identified subgroup of event records from the plurality of different data formats into normalized event records in a standardized event record format, wherein normalizing includes identifying, for each event record of the subgroup of event records, a permissions associated with occurrence of an event of the event record;

map the identified subgroup of normalized event records to a group of required permissions using a permission hierarchy;

identify a group of granted permissions of the user;

determine that the group of granted permissions of the user differs from the group of required permissions to which the identified subgroup of normalized event records is mapped; and perform a permission insight action based on determining that the group of granted permissions of the user differs from the group of required permissions.

2. The system of claim 1, wherein the normalized event record format includes an indicator that indicates minimum permissions required to cause an event of the associated event record.

3. The system of claim 1, wherein performing the permission insight action includes generating a permission report including information associated with the group of granted permissions of the user and the group of required permissions.

4. The system of claim 1, wherein performing the permission insight action includes sending instructions for changing permissions of the user to a system with which a data source of the plurality of data sources is associated.

5. The system of claim 1, wherein the memory and the computer program code are configured to further cause the processor to:

provide an interface for receiving a user-defined permission hierarchy; and receive the permission hierarchy via the provided interface.

6. The system of claim 1, wherein mapping the identified subgroup of normalized event records to the group of required permissions associated with the permission hierarchy includes generating an event permission map, including:

mapping a user identifier of the user to an event collection data structure;

populating the event collection data structure with event entries associated with the identified subgroup of normalized event records associated with the user;

mapping each event entry of the event collection data structure to a required permission collection data structure; and populating each required permission collection data structure with the group of required permissions.

7. The system of claim 1, wherein identifying the group of granted permissions of the user includes identifying granted permissions of a current permission grouping that is assigned to the user;

wherein determining that the group of granted permissions of the user differs from the group of required permissions to which the identified subgroup of normalized event records is mapped further includes determining a recommended permission grouping that includes the group of required permissions; and wherein performing the permission insight action includes generating a recommendation indicating the recommended permission grouping in association with the user.

8. A computerized method comprising:

obtaining a group of event records in parallel from a plurality of data sources through a plurality of parallel data ingestion threads, the group of event records being stored in a plurality of different data formats of the plurality of data sources;

identifying a subgroup of event records associated with a user in the obtained group of event records;

normalizing the identified subgroup of event records from the plurality of different data formats into normalized event records in a standardized event record format, wherein normalizing includes identifying, for each event record of the subgroup of event records, a permissions associated with occurrence of an event of the event record;

mapping the identified subgroup of normalized event records to a group of required permissions using a permission hierarchy;

identifying a group of granted permissions of the user;

determining that the group of granted permissions of the user is more permissive than the group of required permissions to which the identified subgroup of normalized event records is mapped using the permission hierarchy; and performing a permission insight action based on determining that the group of granted permissions of the user is more permissive than the group of required permissions.

9. The computerized method of claim 8, wherein the normalized event record format includes an indicator that indicates minimum permissions required to cause an event of the associated event record.

10. The computerized method of claim 8, wherein performing the permission insight action includes generating a permission report including information associated with the group of granted permissions of the user and the group of required permissions.

11. The computerized method of claim 8, wherein performing the permission insight action includes sending instructions for changing permissions of the user to a system with which a data source of the plurality of data sources is associated.

12. The computerized method of claim 8, further comprising:

providing an interface for receiving a user-defined permission hierarchy; and receiving the permission hierarchy via the provided interface.

13. The computerized method of claim 8, wherein mapping the identified subgroup of normalized event records to the group of required permissions associated with the permission hierarchy includes generating an event permission map, including:

mapping a user identifier of the user to an event collection data structure;

populating the event collection data structure with event entries associated with the identified subgroup of normalized event records associated with the user;

mapping each event entry of the event collection data structure to a required permission collection data structure; and populating each required permission collection data structure with the group of required permissions.

14. The computerized method of claim 8, wherein identifying the group of granted permissions of the user includes identifying granted permissions of a current permission grouping that is assigned to the user;

wherein determining that the group of granted permissions of the user is more permissive than the group of required permissions to which the identified subgroup of normalized event records is mapped further includes determining a recommended permission grouping that includes the group of required permissions; and wherein performing the permission insight action includes generating a recommendation indicating the recommended permission grouping in association with the user.

15. A computer storage medium has computer-executable instructions that, upon execution by a processor, cause the processor to at least:

obtain a group of event records in parallel from a plurality of data sources through a plurality of parallel data ingestion threads, the group of event records being stored in a plurality of different data formats of the plurality of data sources;

identify a subgroup of event records associated with a user in the obtained group of event records;

normalize the identified subgroup of event records from the plurality of different data formats into normalized event records in a standardized event record format, wherein normalizing includes identifying, for each event record of the subgroup of event records, a permissions associated with occurrence of an event of the event record;

map the identified subgroup of normalized event records to a group of required permissions using a permission hierarchy;

identify a group of granted permissions of the user;

determine that the group of granted permissions of the user is less permissive than the group of required permissions to which the identified subgroup of normalized event records is mapped using the permission hierarchy; and perform a permission insight action based on determining that the group of granted permissions of the user is less permissive than the group of required permissions.

16. The computer storage medium of claim 15, wherein the normalized event record format includes an indicator that indicates minimum permissions required to cause an event of the associated event record.

17. The computer storage medium of claim 15, wherein performing the permission insight action includes generating a permission report including information associated with the group of granted permissions of the user and the group of required permissions.

18. The computer storage medium of claim 15, wherein performing the permission insight action includes sending instructions for changing permissions of the user to a system with which a data source of the plurality of data sources is associated.

19. The computer storage medium of claim 15, wherein the computer-executable instructions, upon execution by the processor, further cause the processor to at least:

provide an interface for receiving a user-defined permission hierarchy; and receive the permission hierarchy via the provided interface.

20. The computer storage medium of claim 15, wherein mapping the identified subgroup of normalized event records to the group of required permissions associated with the permission hierarchy includes generating an event permission map, including:

mapping a user identifier of the user to an event collection data structure;

populating the event collection data structure with event entries associated with the identified subgroup of normalized event records associated with the user;

mapping each event entry of the event collection data structure to a required permission collection data structure; and populating each required permission collection data structure with the group of required permissions.

* * * * *